United States Patent [19]

Young

[11] Patent Number: 4,527,393
[45] Date of Patent: Jul. 9, 1985

[54] CONTROL DEVICE FOR A HYDROSTATIC TRANSMISSION

[75] Inventor: John E. G. Young, Watertown, N.Y.

[73] Assignee: General Signal Corporation, Stamford, Conn.

[21] Appl. No.: 298,883

[22] Filed: Sep. 2, 1981

[51] Int. Cl.³ ............................................. F16D 31/02
[52] U.S. Cl. ........................................ 60/327; 60/389; 60/444; 60/447; 60/452
[58] Field of Search ................. 60/447, 389, 444, 327, 60/450, 452; 91/375 R

[56] References Cited

U.S. PATENT DOCUMENTS

| 2,630,681 | 3/1953 | Ferris | 60/447 |
|---|---|---|---|
| 3,117,420 | 1/1964 | Young | 60/385 |
| 3,127,745 | 4/1964 | Young | 60/389 |
| 3,152,445 | 10/1964 | Weisenbach | 60/389 |
| 3,164,960 | 1/1965 | Weisenbach et al. | 60/389 |
| 3,166,891 | 1/1965 | Weisenbach | 60/389 |
| 3,182,912 | 5/1965 | Weisenbach | 236/35 |
| 3,185,439 | 5/1965 | Inaba et al. | 91/375 R |
| 3,191,382 | 6/1965 | Weisenbach | 60/389 |
| 3,225,618 | 12/1965 | Page | 74/865 |
| 3,238,723 | 3/1966 | Young | 60/444 |
| 3,286,990 | 11/1966 | Weisenbach | 60/389 |
| 3,411,297 | 11/1968 | Hann | 60/389 |
| 3,785,754 | 1/1974 | Miller | 60/444 |
| 3,854,847 | 12/1974 | Schlecht | 60/444 |
| 3,866,420 | 2/1975 | Appel | 60/447 |
| 3,871,177 | 3/1975 | Ridlen | 60/431 |
| 3,902,320 | 9/1975 | Marietta | 60/447 X |
| 3,996,743 | 12/1976 | Habiger et al. | 60/431 |
| 4,047,590 | 9/1977 | Hoashi et al. | 180/139 |
| 4,094,145 | 6/1978 | Habiger | 60/447 |
| 4,158,529 | 6/1979 | Nonnemacher et al. | 417/216 |
| 4,182,125 | 1/1980 | Spivey, Jr. | 60/431 |
| 4,194,362 | 3/1980 | Nonnemacher | 60/447 |
| 4,203,712 | 6/1980 | Uehara | 417/218 |
| 4,212,164 | 7/1980 | Young | 60/452 |
| 4,351,152 | 9/1982 | Reynolds et al. | 60/911 |

FOREIGN PATENT DOCUMENTS

| 2208172 | 2/1972 | Fed. Rep. of Germany . | |
| 2823559 | 6/1979 | Fed. Rep. of Germany | 60/447 |
| 1310351 | 3/1973 | United Kingdom . | |

OTHER PUBLICATIONS

Dr. Sc. Dipl. Phys. Jean Thoma, Hydrostatische Getriebe, pp. 106-107.

Primary Examiner—Sheldon J. Richter
Assistant Examiner—Randolph A. Smith
Attorney, Agent, or Firm—Barnes & Thornburg

[57] ABSTRACT

A control device for a hydrostatic transmission including apparatus for sensing a speed of a prime mover which powers a variable displacement pump of the hydrostatic transmission and for regulating the displacement of the variable displacement pump in accordance with the speed of the prime mover, is disclosed. The control device also includes apparatus for transmitting a mechanical feedback signal representative of the displacement of the variable displacement pump to the control device to maintain the variable displacement pump at a displacement proportional to the speed of the prime mover.

17 Claims, 3 Drawing Figures

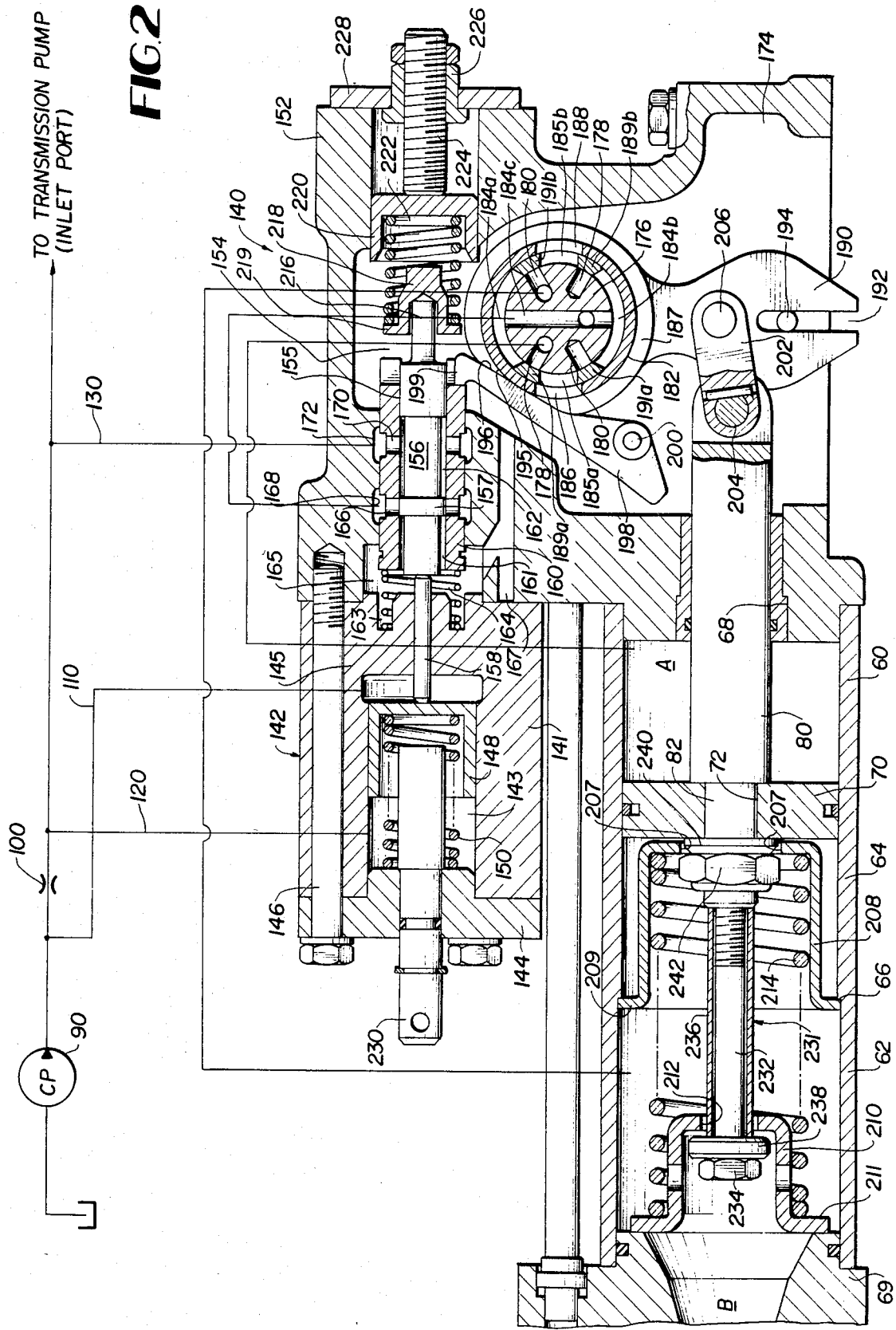

CONTROL DEVICE FOR A HYDROSTATIC TRANSMISSION

BACKGROUND OF THE INVENTION

The invention disclosed herein pertains generally to hydrostatic transmissions, and more particularly to a control device for a hydrostatic transmission.

Hydrostatic transmissions are well known and are used, for example, in land vehicles. Typically, a hydrostatic transmission includes a prime mover, such as an internal combustion engine, a variable displacement pump mechanically powered by the prime mover, and a fluid motor powered by the variable displacement pump. In addition a fixed displacement pump, called a charge pump, powered by the prime mover replenishes any hydraulic fluid used in the hydrostatic transmission which may be lost as a result of leakage.

Control systems for hydrostatic transmissions are also known. U.S. Pat. No. 3,152,445 to Weisenbach, for example, discloses a hydrostatic transmission having a speed control system which ensures that a fluid motor unit does not exceed a predetermined speed. The position of the cam plate of the variable displacement pump of the hydrostatic transmission is regulated by a manually actuable position responsive servo control. The Weisenbach position responsive servo control includes a servo valve which fluidically controls a piston which is mechanically linked to the cam plate. The position of the cam plate is fed back to the servo valve by a mechanical linkage to maintain the cam plate at a position selected by the manual input to the servo valve.

To ensure that the fluid motor speed does not exceed a predetermined maximum value, and to ensure that this speed is maintained substantially constant at the predetermined maximum value, an orifice control device is provided at the outflow of the fluid motor to sense its speed by sensing a pressure drop across a bore. This pressure drop is communicated to a speed control valve which controls the fluid communication between a charging pump and the servo valve to limit the fluid motor speed by positioning the cam plate and renders the manual control ineffective. Thus, the Weisenbach control device senses the speed of the fluid motor in order to conform the displacement of the variable displacement pump to a predetermined maximum speed of the fluid motor.

Another control device for variable displacement pumps is that disclosed in U.S. Pat. No. 4,158,529 to Nonnemacher et al. The Nonnemacher et al device prevents overshoots and undershoots of the adjustment of the output of a variable output pump for changes in the speed of the prime mover. The adjusting element of the variable-output pumps is controlled by a slide valve whose position is controlled by the output of a pump which represents the speed of the prime mover. A mechanical feedback signal from the adjustable element of the variable output pumps to the slide valve prevents over and undershooting.

Yet another control device for a variable displacement pump is that disclosed in U.S. Pat. No. 3,871,177 to Ridlen. In part, the Ridlen device regulates the displacement of the variable displacement pump in accordance with the speed of the prime mover by sensing the pressure of the discharge from a gear pump driven by the prime mover. This pressure is communicated to a piston of a pilot spool in order to urge the pilot spool to move to a position which, in part, is representative of the speed of the prime mover, to thereby vary the displacement of the variable displacement pump. The motion of the pilot spool uncovers a port resulting in pressurized fluid being communicated from the gear pump to an annular piston encircling the pilot spool to urge the annular piston to undergo a motion corresponding to that of the pilot spool. That is, the motion of the pilot spool results in a fluid signal from the gear pump being communicated to the annular piston, to urge the annular piston to undergo a corresponding motion.

Other control devices for hydrostatic transmissions are those disclosed in the following patents: U.S. Pat. No. 2,630,681 to Ferris; U.S. Pat. No. 3,996,743 to Habiger et al; U.S. Pat. No. 4,047,590 to Hoashi et al; U.S. Pat. No. 4,094,145 to Habiger; U.S. Pat. No. 4,182,125 to Spivey, Jr.; and U.S. Pat. No. 4,203,712 to Uehara.

While the prior art does disclose various types of control devices for hydrostatic transmissions, the prior art does not disclose a control device for a hydrostatic transmission like that of the present invention.

SUMMARY OF THE INVENTION

The present invention is directed to a control device for a hydrostatic transmission which varies the speed of the fluid motor in response to the variances of speed of the prime mover by varying the displacement of the variable displacement pump in addition to the resulting variance in speed of the variable displacement pump. Also, the control device is intended to regulate the displacement of the variable displacement pump to brake the fluid motor to zero speed in response to another input even though the speed of the prime mover may be retained high to carry out auxiliary functions.

Accordingly, a primary object of the present invention is to provide a control device for a hydrostatic transmission powered by a prime mover, which control device senses the speed of the prime mover and regulates the displacement of the variable displacement pump of the hydrostatic transmission in accordance with the speed of the prime mover.

Another object of the present invention is to provide a position responsive servo control device for a hydrostatic transmission wherein a mechanical feedback signal representative of the displacement of the variable displacement pump is transmitted to the control device in order to maintain the variable displacement pump at a displacement proportional to the speed of the prime mover.

Yet another object of the present invention is to provide a control device for a hydrostatic transmission which can be manually overridden to decrease the displacement of the variable displacement pump irrespective of the speed of the prime mover.

Thus, a hydrostatic transmission, according to the present invention, includes a prime mover which operates at a variable speed. The prime mover powers a variable displacement pump which in turn powers a fluid motor. The hydrostatic transmission of the present invention also includes control means for sensing a speed of the prime mover and for regulating the displacement of the variable displacement pump in accordance with the speed of the prime mover. The control means includes feedback signal means, mechanically linking the control means to the variable displacement pump, for transmitting a mechanical feedback signal representing the displacement of the variable displacement pump to the control means to hold the pump at a displacement proportional to the speed of the prime mover.

BRIEF DESCRIPTION OF THE DRAWINGS

A preferred embodiment of the present invention is described with reference to the accompanying drawings wherein like numerals refer to like members, and wherein:

FIG. 2 is a cross-sectional view of a preferred embodiment of the control device of the hydrostatic transmission of the present invention.

DESCRIPTION OF THE PREFERRED EMBODIMENT

Figure 1:
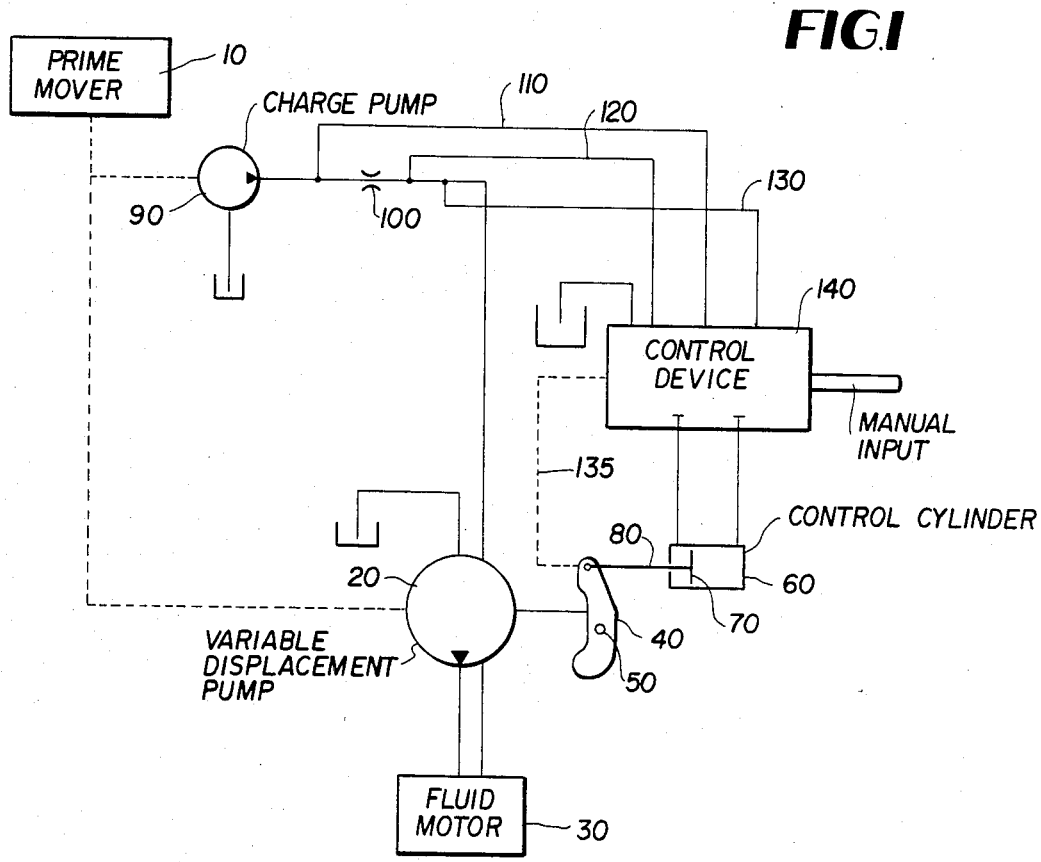
FIG. 1 is a schematic diagram of a hydrostatic transmission, according to the present invention.

With reference to FIG. 1, a preferred embodiment of a hydrostatic transmission, according to the present invention, includes a variable speed prime mover 10, such as an internal combustion engine, a variable displacement pump 20 driven by the prime mover 10, and a fluid motor 30 driven by the variable displacement pump 20. The displacement of the variable displacement pump 20 is determined by the angular position of a displacement control element or swash plate 40, which swash plate 40 pivots about a pivot 50. The angular position of the swash plate 40 is in turn regulated by a control cylinder 60, which control cylinder includes a control piston 70 and a control piston rod 80. One end of the control piston rod 80 is connected to the control piston 70 and the opposite end of the control piston rod 80 is connected to an upper end of the swash plate 40.

The preferred embodiment of the hydrostatic transmission of the present invention also includes a charge pump 90 which is also driven by the prime mover 10. The charge pump 90, which is a fixed displacement pump, delivers makeup hydraulic fluid to an inlet port of the variable displacement pump in order to replenish any fluid lost as a result of leakage by the hydrostatic transmission.

Arranged at an outlet of the charge pump 90 is an orifice 100. Because the charge pump is powered by the variable speed prime mover 10, the volumetric outflow from the charge pump 90 is proportional to the speed of the prime mover, and thus the pressure drop across the orifice 100 is also proportional to the speed of the prime mover. The pressure drop across the orifice 100 is sensed by a control device 140 by lines 110 and 120 connected to points upstream and downstream, respectively, of the orifice 100. Relatively high pressure fluid from the charge pump 90 is also supplied to the control device 140 by a line 130.

The control device 140 is in fluid communication with the rod end and head end of the control cylinder 60. The control device 140 is able to deliver relatively high pressure fluid supplied by the charge pump 90 through the line 130 to either end of the control cylinder and simultaneously communicate relatively low pressure to the opposite end of the control cylinder, in order to displace the piston 70 either to the right or to the left (as viewed in FIG. 1) in order to thereby pivot the swash plate 40 in either a clockwise or counterclockwise direction (as viewed in FIG. 1). Thus, the control device 140 senses the speed of the prime mover 10 by sensing the pressure drop across the orifice 100, and regulates the displacement of the variable displacement pump 20 in accordance with the speed of the prime mover by pivoting the swash plate 40 to a high displacement position when the speed of the prime mover increases, and by pivoting the swash plate 40 to a low displacement position when the speed of the prime mover decreases.

As the swash plate 40 is pivoted about the pivot 50 by the control piston 70, a mechanical feedback signal representative of the angular displacement of the swash plate 40 is transmitted to the control device 140. This feedback signal, which is denoted by the dashed line 135 in FIG. 1, is used to hold the variable displacement pump 20 at a displacement proportional to the speed of the prime mover as sensed by the control device 140.

With reference to FIG. 2, a preferred embodiment of the control device 140, according to the present invention, includes a speed sense cylinder 142. The cylinder 142 includes a body portion 141 having an internal bore 143 and an end cap 144 at the left end of the cylinder (as viewed in FIG. 2) closing off the open mouth of the bore 143. A transverse wall 145 defines the right end of the cylinder. A plurality of bolts 146 secures together the end cap 144 to the body portion 141 and to a housing 152 of the remainder of the control device 140.

Arranged within the bore 143 of the speed sense cylinder 142 is a speed sense piston 148 which may move along a longitudinal axis of the speed sense cylinder 142. A speed sense spring 150 extends between the end cap 144 and the speed sense piston 148, biasing the piston to a predetermined, initial position near the right end (as viewed in FIG. 2) of the cylinder 142.

Two radial bores (not shown) are provided in the body portion 141 of the speed sense cylinder to enable fluid from points upstream and downstream, respectively, of the orifice 100 to be supplied by the lines 110 and 120 to the right side and left side (as viewed in FIG. 2) of the speed sense piston 148. Thus, for example, when the speed of the prime mover 10 increases the pressure drop across the orifice 100 increases, resulting in the speed sense piston 148 being urged to move to the left against the spring 150.

A rod 230 is provided within the bore 143 of the speed sense cylinder 142. The right hand end (as viewed in FIG. 2) of the rod 230 projects into the interior of the cylinder 142 while the left hand end of the rod 230 projects through a longitudinal aperture in the end cap 144. The portion of the rod 230 within the bore 143 is encircled by the speed sense spring 150.

The housing 152 includes a longitudinal bore 154, a longitudinal axis of which bore is substantially aligned with a longitudinal axis of the speed sense cylinder 142. Arranged within the longitudinal bore 154 is a cylindrical compensator spool 156 having a longitudinal axis which is substantially aligned with the longitudinal axis of the bore 154. The compensator spool 156 includes cylindrical lands 155 and 157 provided, respectively, at the right end (as viewed in FIG. 2) and intermediate the ends of the spool. A pin 158, which extends through a longitudinal bore in the transverse wall 145 of the speed sense cylinder 142, abuts against the opposite ends of the speed sense piston 148 and the compensator spool 156. The bore in the transverse wall through which the pin extends has a longitudinal axis which is substantially aligned with the longitudinal axes of the speed sense cylinder 142 and the bore 154.

Also arranged within the bore 154 is an annular compensator sleeve 160 which encircles the compensator spool 156. A longitudinal axis of the compensator sleeve 160 is substantially aligned with the longitudinal axis of the compensator spool 156. Furthermore, an inner diameter of the compensator sleeve 160 is greater than the diameter of the cylindrical compensator spool 156, to define a compensator annular space between the compensator sleeve and compensator spool, which compensator annular space includes compensator annular space 161 to the left of land 157 (as viewed in FIG. 2) and compensator annular space 162 between the lands 155 and 157. Fluid may flow through annular space 162 between lands 155 and 157, which lands have diameters substantially equal to the diameter of the inner surface of the sleeve 160, and fluid may flow through annular space 161.

A biasing spring 164 is provided within the bore 154, between the left end (as viewed in FIG. 2) of the compensator sleeve 160 and an annular depression 163 in the transverse wall 145 of the cylinder 142, to bias the sleeve 160 to the right (as viewed in FIG. 2). As will be explained more fully later, the spring is biasing against the mechanical position feedback of the swash plate 40.

The preferred embodiment of the control device 140 also includes apparatus for regulating or defining the magnitude of the speed of the prime mover at which the displacement of the variable displacement pump begins to increase from zero. This apparatus, which is arranged in the bore 154, includes a finger 216 projecting to the right from, and connected to, a right end (as viewed in FIG. 2) of the compensator spool 156. A cylindrical finger receiving member 218 is arranged adjacent the compensator spool and includes a longitudinal depression which receives the finger 216 and includes a radial flange 219 projecting radially from the body of the member 218 to thereby define a circumferential shoulder.

A spring holder 220 is provided adjacent the finger receiving member 218. The spring holder, which is generally U-shaped in cross-section, is longitudinally movable within the bore 154. A spring 222 is provided between the finger receiving member 218 and the spring holder 220. One end of the spring 222 abuts against the circumferential shoulder about the body of the member 218, while the opposite end of the spring 222 is in contact with the spring holder 220.

The apparatus for regulating or defining the magnitude of the speed of the prime mover at which the displacement of the variable displacement pump begins to increase also includes an adjusting screw 224. One end of the screw 224 abuts against the spring holder 220, while the opposite end of the screw is received in a threaded, longitudinal bore in a bushing 226. The bushing, in turn, is received, and extends through, an aperture in a cover plate 228 which closes off the bore 154.

By advancing the adjusting screw 224 into the bore 154, for example, the spring holder 220 is urged to move toward the finger receiving member 218, and the spring 222 is thereby tensioned by the displacement of the spring holder 220 relative to the member 218. The motion of the spring holder 220 and the resulting tension in the spring 222 urge the finger receiving member 218 into firm engagement with the finger 216, thereby urging the compensator spool 156 into firm and abutting contact with the pin 158. The pin 158 in turn urges the speed sense piston 148 into firm engagement with the speed sense spring 150. Thus, by advancing the screw 224 into the bore 154, the tension in the spring 222 is increased, and this tension is communicated to the spring 150 through the compensator spool 156, pin 158, and speed sense piston 148, thereby tensioning the spring 150. The tension in the spring 222 urges the speed sense piston 148 to move to the left (as viewed in FIG. 2), while the tension in the spring 150 opposes the leftward motion of the speed sense piston 148. Although the tensions in the springs 222 and 150 may be regulated by advancing (or withdrawing) the adjusting screw 224 into the bore 154, the positions of the compensator spool 156 and speed sense piston 148 are unaffected by the adjusting screw 224, and remain stationary. The compensator spool 156 and speed sense piston 148 are merely subjected to a new force equilibrium when the adjusting screw 224 is advanced or withdrawn.

By virtue of the pin 158 and the tensions in the springs 150 and 222, when the speed sense piston moves within the bore 143 of the speed sense cylinder 142, the compensator spool 156 and the cylindrical lands 155 and 157 undergo a corresponding longitudinal motion within the bore 154.

The compensator sleeve 160 includes two axially spaced, annular openings 166 and 170. The leftmost annular opening 166 (as viewed in FIG. 2) is aligned with a port 168 in the wall of the housing 152, while the rightmost annular opening 170 is aligned with a port 172 in the wall of the housing 152. When the compensator spool 156 and the compensator sleeve 160 are biased to their respective initial positions by the springs 150, 222, and 164 (as shown in FIG. 2), which positions correspond to zero displacement for the variable displacement pump 20, the cylindrical land 157 is almost, but not quite, aligned with the leftmost annular opening 166.

Depending on the position of the land 157 relative to the annular opening 166 in the sleeve 160 as controlled by the speed sense cylinder 142, the port 168 may communicate either with a space 165 at the leftmost end of the bore 154 via the compensator annular space 161, or with the port 172 via the compensator annular space 162 and opening 170 in sleeve 160. The space 165 is exposed to relatively low pressure (hereinafter referred to as case drain pressure via passage 167), while the port 172 is supplied with relatively high pressure fluid by the charge pump 90. Thus, depending upon the position of the land 157 relative to the annular opening 166, the port 168 is either exposed to case drain pressure from space 165 or is supplied with relatively high pressure fluid from port 172. At zero displacement of the variable displacement pump 20, the land 157 is slightly misaligned with the port 168, that is, the land 157 is aligned slightly to the right of the port 168 (as viewed in FIG. 2). Thus, at zero displacement, the port 168 is exposed to case drain pressure from the space 165 via the compensator annular space 161.

Land 155 on compensator spool 156 blocks relatively high pressure fluid from flowing from port 172 via annular opening 170 and compensator annular space 162 into the rightmost portion of bore 154 (as viewed in FIG. 2). Thus, relatively high pressure fluid from port 172 can only flow toward port 168.

Provided within a lower end of the housing 152 and in fluid communication with bore 154 is a chamber 174. Arranged within the chamber 174 is a cylindrical servo spool 176. The servo spool 176 is manually rotatable about a longitudinal axis in either a clockwise or counterclockwise direction from the neutral position (illustrated in FIG. 2) to define a desired forward or reverse displacement of the variable displacement pump. The servo spool 176 includes two angularly spaced radial ports 178 and 180. The radial port 178 is in continuous fluid communication with the rod end of the control cylinder 60, while the radial port 180 is in continuous fluid communication with the head end of the control cylinder 60.

Also arranged within the chamber 174 is an annular servo control sleeve 182 which encircles, and is substantially coaxial with, the servo spool 176. A cylindrical jacket 187 encircles, and is connected to, the servo control sleeve 182. The servo control sleeve 182 and jacket 187 are rotatable about a longitudinal axis in either a clockwise or counterclockwise direction (as viewed in FIG. 2). An inner diameter of the servo control sleeve 182 is greater than the diameter of the servo spool 176 to define a servo control annular space. The servo control annular space includes partitioned, radially opposed annular sectors 184a and 184b, which sectors are in fluid communication with one another via a radial channel 184c. The sectors 184a and 184b and the connecting channel 184c are in continuous fluid communication with the leftmost port 168 in the housing 152 adjacent the compensator spool 156 and compensator sleeve 160.

Radially opposed radial bores 186 and 188 are provided in the servo control sleeve 182 to expose partitioned portions 185a and 185b of the servo control annular space to case drain pressure to thereby define low pressure ports. The portion 185a is partitioned from the annular sectors 184a and 184b by lands 189a and 191a, while the portion 185b is partitioned from the annular sectors 184a and 184b by lands 189b and 191b. Thus, the servo control spool may be rotated, relative to the servo control sleeve, in a clockwise direction about its longitudinal axis to align the radial port 178 with the annular sectors 184a and 184b and to align the radial port 180 with the low pressure ports 186 and 188. On the other hand, the servo control spool may be rotated, relative to the servo control sleeve, in a counterclockwise direction to align the radial port 178 with the low pressure ports 186 and 188 and to align the radial port 180 with the annular sectors 184a and 184b.

A mechanical feedback signal apparatus provided within the chamber 174 mechanically links the swash plate 40 to the control device 140. The feedback signal apparatus includes a lever 190 connected to a lower end of the cylindrical jacket 187 of the servo sleeve 182. The lever 190 includes a slot 192, within which slot is arranged a pin 194 which is connected to an upper end of the swash plate 40 protruding into the chamber 174. When the swash plate 40 is pivoted in a clockwise or counterclockwise direction, the servo sleeve 182 and cylindrical jacket 187 undergo a corresponding counterclockwise or clockwise rotation relative to the servo spool 176.

The feedback signal apparatus also includes a camming surface 196 provided on the upper left quadrant 195 of the outer surface of the jacket 187 which is a flat surface compared to the generally circular surface of the remainder of jacket 187 (as viewed in FIG. 2). A cam follower 198, a lower end of which cam follower is mounted on a pivot 200, rides upon the camming surface 196. An upper end of the cam follower 198 includes a hammer like member 199 which abuts against a right end (as viewed in FIG. 2) of the compensator sleeve 160. As can be seen, rotation of the servo sleeve 182 and jacket 187 in either a clockwise or counterclockwise direction from the zero displacement position shown in FIG. 2 will cause the cam follower 198 to pivot in a counterclockwise direction off the flat canning surface 196 into engagement with the compensator sleeve 160. The spring 164 in the bore 154, which spring is arranged between the annular wall 145 and the compensator sleeve 160, thus biases the compensator sleeve 160 against the hammer like member 199, the position of which hammer like member defines the mechanical position feedback of the swash plate 40.

The control cylinder 60 is connected to a lower left end (as viewed in FIG. 2) of the housing 152. A longitudinal axis of the control cylinder 60 is substantially parallel to the longitudinal axis of the speed sense cylinder 142. The cylinder 60 includes a first portion 62 and a second portion 64, the former being more distant than the latter from the housing 152. An inner diameter of the first portion 62 is greater than an inner diameter of the second portion 64, the juncture between the two defining a circumferential shoulder 66.

Arranged within the second portion 64 of the control cylinder 60 is the control piston 70. The control piston rod 80, which is provided adjacent the right side of the piston 70 (as viewed in FIG. 2), extends through a longitudinal aperture 68 in the wall of the housing 152 into the chamber 174 in the housing 152. One end of a link 202 is pivotably connected by a pin 204 to the end of the piston rod 80 which extends into the chamber 174, while the opposite end of the link 202 is pivotably connected to an upper end of the swash plate 40 by a pin 206.

Also arranged within the second portion 64 of the control cylinder 60, adjacent the left side of the control piston 70 (as viewed in FIG. 2), is a first spring holder 208. In cross-section, the spring holder 208 is U-shaped. The first spring holder 208 includes radial flanges 209 whose radial extent is substantially equal to the inner diameter of the first portion 62 of the cylinder 60 and which slide along the inner surface of the first portion 62 when the spring holder 208 is moved leftwards (as shown in FIG. 2) towards the first portion 62 by piston 70. However, the circumferential shoulder 66 which defines the juncture between the first and second portions acts as a stop, to thereby define the maximum penetration of the first spring holder 208 into the second portion of the control cylinder 60.

A second spring holder 210 is provided in the first portion 62 of the cylinder 60 abutting against an end plate 69 covering the end of the cylinder 60 opposite the end connected to the housing 152. The second spring holder 210 is smaller in size than the first, but is also U-shaped in cross-section and includes radial flanges 211 extending radially away from the body of the second spring holder to define an external, circumferential shoulder about the second spring holder 210. The second spring holder also includes an axial bore 212 which receives a cylindrical guide 231 which extends through the axial bore.

The cylindrical guide 231 for the spring holder 210 extends through the longitudinal aperture 212 in the spring holder 210 and through a longitudinal aperture 207 in the spring holder 208. The guide 231 includes a bolt 232, having a head 234, which bolt is received in a cylindrical sheath 236. The head 234 is arranged at the left side (as viewed in FIG. 2) of the aperture 212 in the spring holder 210. Mounted on the bolt 232, between the head 234 and the aperture 212 is a washer 238 whose outer diameter is greater than that of the aperture 212. The end of the bolt 232 is threadably received in a cylindrical extension 82 of the control piston rod 80, which extension 82 extends through a longitudinal aperture 72 in the control piston 70 and through the aperture 207 in the spring holder 208. A washer 240 is mounted on the extension 82 within the aperture 207, adjacent the left side of the piston 70 (as viewed in FIG. 2). A tightening nut 242 is also threadably mounted on the extension 82 adjacent the washer 240. The washer 240 engages the spring holder 208 and moves it to the left when piston 70 moves left.

A helical biasing spring 214 is arranged within the cylinder 60, encircling the guide 231. One end of the spring 214 is arranged within the first spring holder 208 while the opposite end of the spring 214 abuts against the external, circumferential shoulder defined by the radial flanges 211 about the second spring holder 210. The function of the spring 214 is to bias the control piston 70 to a predetermined initial position at which the swash plate 40 is at zero displacement when both sides of the cylinder 60 are exposed to case drain pressure. The spring 214 accomplishes this function by biasing the spring holder 210 into abutting relation with the end plate 69 and biasing the radial flanges 209 of the spring holder 208 into engagement with the stop defined by the circumferential shoulder 66, thereby biasing the swash plate 40, through the piston 70 and piston rod 80, to the zero displacement position.

As noted above, the radial bore 178 in the servo spool 176 is in continuous fluid communication with the rod end of the control cylinder, i.e. the right end of the control cylinder (as viewed in FIG. 2) denoted A, while the radial bore 180 in the servo spool 176 is in continuous fluid communication with the head end of the control cylinder, i.e. the left end of the control cylinder denoted B. Starting from the zero displacement position shown in FIG. 2, when relatively high pressure fluid is supplied to the rod end A of the cylinder 60 through the radial bore 178 and the head end B of the cylinder 60 is exposed to relatively low pressure through the radial bore 180, the pressure differential across the control piston 70 will urge the piston 70 to move to the left (as viewed in FIG. 2), resulting in the swash plate being pivoted in the counterclockwise direction. As the piston 70 moves to the left, the piston 70 will displace the spring holder 208 to the left moving flange 209 off the shoulder 66 while spring holder 210 is stationary, resulting in the spring 214 becoming compressed and tensioned. On the other hand, and also starting from the zero displacement position shown in FIG. 2, when relatively high pressure fluid is supplied to the head end B of the cylinder 60 through the radial bore 180 and the rod end A of the cylinder 60 is exposed to relatively low pressure through the radial bore 178, the pressure differential across the control piston 70 will urge the piston 70 to move to the right (as viewed in FIG. 2), resulting in the piston rod 80 being moved to the right, and the swash plate being pivoted in a clockwise direction. As the piston 70 and the piston rod 80 move to the right, the spring holder 208 remains stationary because the radial flanges 209 of the spring holder 208 remain in abutting relation with the stop defined by the circumferential shoulder 66 within the cylinder 60. However, as the piston 70 and piston rod 80 move to the right the guide 231, which is connected to the piston rod 80 through the extension 82, also moves to the right. As the guide 231 moves to the right the washer 238 mounted on the bolt 232 will engage and move the spring holder 210 to the right relative to the spring holder 208, thereby compressing and tensioning the spring 214.

In considering the operation of the present invention, it must be noted that the position of the swash plate 40 shown in FIG. 2, as well as the corresponding initial positions of the various components of the control device 140 shown in FIG. 2, corresponds to zero displacement of the variable displacement pump 20. That is, at zero displacement the initial positions of the various components of the control device 140 are such that the cylindrical land 157 on the compensator spool 156 is slightly misaligned with the annular opening 166 in the compensator sleeve 160, blocking fluid communication between the port 168 and the high pressure port 172 while allowing case drain pressure to be communicated to the port 168 from the low pressure space 165.

As noted above, the present invention includes apparatus for regulating or defining the magnitude of the speed of the prime mover at which the displacement of the variable displacement pump begins to increase from zero. In the description of the operation of the present invention given below, it is assumed that the initial tensions in the spring 222 and in the speed sense spring 150 is such that the speed sense cylinder 148 will not begin to move against the spring 150, to compress the spring 150, until the pressure drop across the orifice 100 corresponds to a speed of the prime mover 10 in excess of, for example, 1000 rpm.

With the servo spool 176 in the neutral position shown in FIG. 2, and regardless of the speed of the prime mover 10, the variable displacement pump 20 will remain at zero displacement because both of the radial bores 178 and 180 in the servo spool 176, which bores communicate, respectively, with the rod end and head end of the control cylinder 60, are closed off, respectively, by lands 189a, 189b and 191a, 191b, and thus the control cylinder is hydraulically locked with a zero pressure differential across the control piston 70.

With the prime mover 10 started and operating at less than 1000 rpm, and with the servo spool 176 rotated in a clockwise direction to a forward displacement position of the variable displacement pump, for example, to align radial port 178 with the annular sectors 184a and 184b and the radial port 180 with the low pressure ports 186 and 188, the variable displacement pump 20 will remain at zero displacement because the port 168 in the housing 152 is exposed to case drain pressure. That is, the annular land 157, which is initially slightly misaligned with the port 168, blocks fluid communication between the port 168 and the high pressure port 172 but allows case drain pressure to be communicated to the port 168 from the low pressure space 165. Because the annular sectors 184a and 184b communicate with the port 168, it follows that the radial bore 178 which has been aligned with the annular sectors 184a and 184b is also exposed to case drain pressure and thus the rod end of the control cylinder 60, which communicates with the bore 178, is exposed to case drain pressure. On the other hand the radial bore 180 has been rotated into alignment with the low pressure ports 186 and 188. Because the radial bore 180 communicates with the head end of the control cylinder 60, it follows that the head end of the control cylinder 60 is exposed to case drain pressure. Thus, the opposite sides of the control piston 70 are exposed to case drain pressure, and therefore there is no pressure differential across the control piston 70 to pivot the swash plate 40 to a higher displacement position.

By increasing the speed of the prime mover to a speed in excess of 1000 rpm, the pressure drop across the orifice 100 will increase sufficiently to enable the speed sense piston 148 to move to the left (as viewed in FIG. 2) against the spring 150, thereby compressing and tensioning the spring 150. As the speed sense piston 148 moves to the left, the compensator spool 156 will also move to the left relative to the compensator sleeve 160, and thus the annular land 157 will move to the left relative to the annular opening 166. That is, as the speed sense piston 148 moves to the left, the annular land 157 will move into alignment with the annular opening 166, and then move out of alignment to the left of the annular opening 166. Once the annular land 157 moves to the left of the annular opening 166, relatively high pressure fluid from the charge pump will flow from the port 172 to the port 168 through the compensator annular space 162. This high pressure fluid is then supplied to the rod end of the control cylinder 60 via the annular sectors 184a and 184b and the radial bore 178 of the servo spool 176. Thus a pressure differential is created across the control piston 70, resulting in the control piston moving to the left (as viewed in FIG. 2), the spring 214 in the control cylinder 60 being tensioned, and the swash plate 40 being pivoted in a counterclockwise direction about the pivot 50 to a high displacement position.

As the swash plate 40 is pivoted in a counterclockwise direction to a high displacement position, the swash plate communicates a mechanical feedback signal to the control device 140, representative of the angular displacement of the swash plate, to hold the variable displacement pump 20 at a displacement proportional to the speed of the prime mover. That is, as the swash plate 40 is pivoted in a counterclockwise direction, and because the swash plate 40 is connected to the servo control sleeve 182 by the pin 194, lever 190, and cylindrical jacket 187, it follows that the control sleeve 182 and cylindrical jacket 187 will be rotated through a corresponding clockwise rotation. As the cylindrical jacket 187 rotates in a clockwise direction, the cam follower 198, which rides on the camming surface 196 provided on the outer surface of the cylindrical jacket 187, will pivot in a counterclockwise direction about the pivot 200 moving the compensator sleeve 160 to the left relative to the compensator spool 156, and thereby tensioning the biasing spring 164. As the compensator sleeve 160 moves to the left relative to the compensator spool 156, the land 157 of compensator spool 156 is brought into exact alignment with the annular opening 166, blocking any further flow of relatively high pressure fluid from the charge pump to the rod end of the control cylinder 60 through the ports 172 and 168 and the radial bore 178. Of course, the alignment of the land 157 with the port 168 will also prevent the communication of case drain pressure to the port 168 from the low pressure space 165. Thus the control cylinder will become closed off to further fluid flow, and the control piston will become hydraulically locked or fixed at a position representative of the speed of the prime mover. The swash plate 40, whose angular position is regulated by the control cylinder, will consequently be fixed at a displacement position proportional to the speed of the prime mover.

Thus, by virtue of the mechanical feedback signal from the swash plate 40 to the servo sleeve 182, which feedback signal is representative of the angular displacement of the swash plate, the control piston 70 becomes hydraulically "locked" in a position representative of the speed of the prime mover and thus the swash plate 40 becomes "locked" in a displacement position which is proportional to the speed of the prime mover.

If the speed of the prime mover is once again increased, the speed sense piston 148 will once again move to the left to further compress the spring 150, and the steps described above will be repeated. This process may continue until the variable displacement pump reaches maximum or full displacement.

A decrease in the speed of the prime mover will result in the speed sense piston 148 moving to the right in response to the tension in the spring 150 and the reduction in the pressure differential across the piston 148. As the speed sense piston 148 moves to the right, the compensator spool 156 will move to the right relative to the compensator sleeve 160. Simultaneously, of course, the cylindrical land 157 will move to the right relative to the annular opening 166, thereby blocking fluid communication between the high pressure port 172 and the port 168 and opening fluid communication between the port 168 and the low pressure space 165. Thus, case drain pressure will be communicated from the space 165 to the rod end of the control cylinder via compensator annular space 161, port 168, annular sectors 184a and 184b, and radial bore 178. Therefore, the pressurized fluid in the rod end of the control cylinder will escape, thereby reducing the pressure differential across the control piston 70, and thus the swash plate 40 will rotate in a clockwise direction to a lower displacement position in response to cam reaction forces and in response to a horizontal thrust imparted to the control piston rod by the previously tensioned biasing spring 214.

As the swash plate pivots in a clockwise direction to a low displacement position, the pin 194 and lever 190 will cause the servo sleeve to rotate in a counterclockwise direction. Thus, the cam follower 198 riding upon the camming surface 196 will pivot in a clockwise direction out of engagement with the compensator sleeve 160, and the compensator sleeve will move to the right relative to the compensator spool 156 under the influence of the tensioned biasing spring 164, until the land 157 is once again aligned with the annular opening 166. When the land 157 is again aligned with the annular opening 166, the control cylinder 60 is once again hydraulically locked and closed off to fluid communication at a new position representing the new speed of the prime mover.

Further decreases in the speed of the prime mover 10 results in the steps described above being repeated until such time as zero displacement of the variable displacement pump 20 is achieved, i.e. at such time when the speed of the prime mover 10 falls to a speed of 1000 rpm or less.

Manually rotating servo spool 176 back to the neutral position shown in FIG. 2 causes the swash plate 40 to go to zero displacement, irrespective of the speed of the prime mover. Thus, for example, if the servo spool 176 had previously been rotated in the clockwise direction to the forward position, and the mechanical feedback signal from the swash plate 40 had consequently resulted in the servo sleeve 182 undergoing a corresponding clockwise rotation, rotating the servo spool 176 to the neutral position will result in the radial bore 178 being rotated into partial alignment with the low pressure ports 186 and 188 rather than into alignment with the lands 189a and 189b. Furthermore, the radial bore 180 will be rotated into partial alignment with the pressurized annular sectors 184a and 184b rather than into alignment with the lands 191a and 191b. Thus, pressurized fluid from the charge pump 90 will be communicated to the head end of the control cylinder 60, while the rod end of the control cylinder will be exposed to case drain pressure and the pressurized fluid in the rod end of the control cylinder will escape. Therefore, the pressure differential across the control piston 70 will be reversed, the control piston will move to the right pivoting the swash plate 40 toward the zero displacement position, and the swash plate 40, through the pin 194, will rotate the servo sleeve in the counterclockwise direction until the lands 189a and 189b are aligned with the radial bore 178 and the lands 191a and 191b are aligned with the radial bore 180. Thus, the control cylinder 60 becomes hydraulically locked in the zero displacement position.

Overcenter or reverse operation of the hydrostatic transmission occurs when the servo spool 176 is rotated in a counterclockwise direction so that the radial bore 178 is aligned with the low pressure ports 186 and 188 and the radial bore 180 is aligned with the annular sectors 184a and 184b. In this mode, the control and operation of the hydrostatic transmission is similar to that described above, only in reverse. That is, when the speed of the prime mover increases, the control piston 70 moves to the right and the swash plate is pivoted in a clockwise direction (as viewed in FIG. 2) to a high displacement position, and when the speed of the prime mover decreases the swash plate is pivoted in a counterclockwise direction to a low displacement position.

It should now be clear that the compensator spool 156, compensator sleeve 160, servo spool 176, and servo sleeve 182 constitute a servomechanism. This servomechanism responds to an input speed signal from the speed sense piston 148 by transmitting a fluid signal to the control cylinder 60 from the charge pump 90 to vary the displacement of the variable displacement pump 20 in accordance with variations in the speed of the prime mover. As the displacement of the variable displacement pump changes, the servomechanism also responds to a mechanical feedback signal from the variable displacement pump to hydraulically lock the control cylinder 60 to hold the variable displacement pump 20 at a displacement proportional to the speed of the prime mover.

It should be noted that the servo spool 176 should be rotated to the full extent clockwise or counterclockwise to allow complete response of the servo system to the speed input. If the servo spool 176 is rotated less than the full extent, the servo spool 176 and sleeve 182 lock the swash plate in a position less than the full position for higher speeds.

As described above, the preferred embodiment of the control device 140 includes apparatus for defining the magnitude of the speed of the prime mover at which the displacement of the variable displacement pump begins to increase from zero. With reference once again to FIG. 2, this apparatus includes the finger 216, the cylindrical finger receiving member 218, the spring holder 220, the spring 222, and the adjusting screw 224.

The function of the screw 224 is to vary the initial tension in the spring 222, which tension is communicated to the spring 150 through the compensator spool 156, the pin 158, and the speed sense piston 148. As shown in FIG. 2, the screw 224 has been advanced as deeply as possible into the bore 154, thereby pretensioning the spring 222 to the maximum possible extent. By withdrawing the screw 224 a certain amount from the bore 154 the initial tension in the spring 222 is reduced. When the screw 224 is advanced into the bore 154, the resulting tension in the spring 222 urges the speed sense piston 148 to move to the left (as viewed in FIG. 2) to compress the spring 150. This initial tension in the spring 222 acts in conjunction with any pressure differential existing across the speed sense piston 148 to enable the speed sense piston 148 to compress the spring 150 at a relatively low pressure differential across the piston 148, which low pressure differential corresponds to a relatively low speed of the prime mover. Thus, a relatively high tension in the spring 222 implies that the displacement of the variable displacement pump 20 will begin to increase from zero at a relatively low speed of the prime mover. On the other hand, when the screw 224 is withdrawn from the bore 154 the tension in the spring 222 is reduced. Thus, the speed sense piston 148 will only begin to compress the spring 150 at a relatively high pressure differential across the piston 148. Therefore, a relatively low tension in the spring 222 implies that the displacement of the variable displacement pump 20 will only begin to increase from zero at a relatively high speed of the prime mover.

Figure 3:
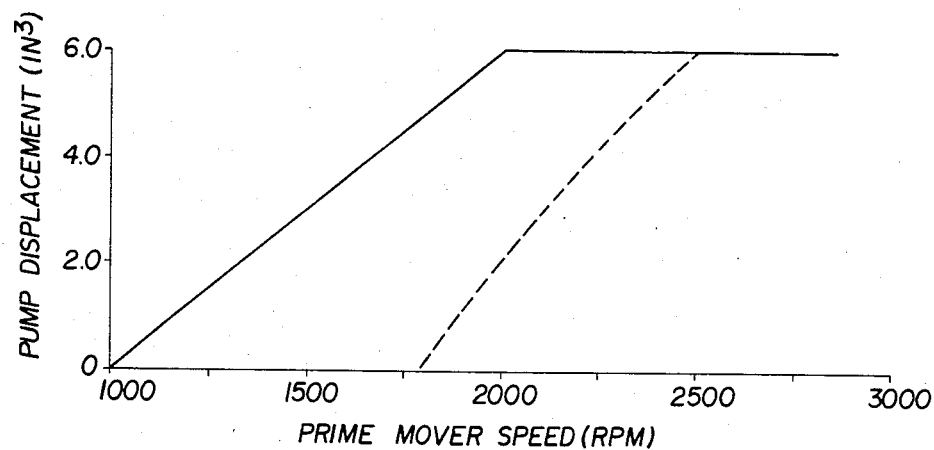
FIG. 3 is a plot of pump displacement as a function of the speed of the prime mover of the hydrostatic transmission of the present invention, for two different settings of the adjusting screw of the control device of the present invention.

With reference to FIG. 3, there is shown two plots of the displacement of the variable displacement pump 20 (in cubic inches) produced by the control device 140 as a function of the speed of the prime mover 10 (in rpm). The first plot, drawn as a solid line, depicts the relationship between pump displacement and the speed of the prime mover when the adjusting screw 224 has been advanced as deeply as possible into the bore 154, and the spring 222 has been tensioned to the maximum extent possible. The first plot indicates that the speed sense piston begins to move to the left (as viewed in FIG. 2), and thus the displacement of the variable displacement pump begins to increase from zero, when the speed of the prime mover reaches, for example, 1000 rpm.

The second plot of pump displacement versus prime mover speed shown in FIG. 3 is drawn as a dashed line. This second plot corresponds to the situation where the adjusting screw has been withdrawn a certain amount from the bore 154, and the initial tension in the spring 222 has been reduced. Thus, the speed sense piston will have to be subjected to a greater pressure differential across the orifice 100, and thus the speed of the prime mover will have to be greater before the displacement of the pump begins to increase from zero, as compared with the situation where the tension in the spring 222 is relatively high. As shown with the second plot in FIG. 3, the displacement of the pump does not begin to increase from zero until the speed of the prime mover increases to, for example, 1800 rpm.

With reference once again to FIG. 2, the preferred embodiment of the present invention includes the rod 230 which may be used to override the control device 140 by pushing the rod into the speed sense cylinder 142. As the rod 230 is pushed into the cylinder 142, it will push the compensator spool 156 to the right relative to the compensator sleeve 160 via speed sense piston 148 and pin 158. Consequently, the cylindrical land 157 will be moved to the right relative to the annular opening 166, and thus case drain pressure will be communicated to the previously high pressure side of cylinder 60 and now both the rod end and head end of the control cylinder 60 are exposed to low pressure resulting in the swash plate 40 being pivoted toward the zero displacement position. Of course, even though the displacement of the variable displacement pump 20 is thereby reduced, the speed of the prime mover may continue to be high so that the prime mover can be used to power auxiliary apparatus.

One of the advantages of the present invention is due to the mechanical feedback signal which is transmitted by the swash plate of the variable displacement pump to the control device of the present invention. This is advantageous because this mechanical feedback signal is representative of the displacement of the variable displacement pump, and enables the control device to close off and hydraulically lock the control cylinder which regulates the swash plate when the swash plate is at a displacement position proportional to the speed of the prime mover.

Another advantage of the control device of the present invention is that the magnitude of the speed of the prime mover at which the displacement of the variable displacement pump will begin to increase from zero may be regulated.

Yet another advantage of the control device of the present invention is that the control device may be manually overridden to decrease the displacement of the variable displacement pump while keeping the speed of the prime mover high. Thus, the hydrostatic transmission of the present invention, including the control device of the present invention, may be used in an automobile, and the control device may be manually overridden by the operator of the automobile by, for example, depressing a brake pedal while keeping the speed of the prime mover, i.e., the speed of the automobile's engine, high in order to power auxiliary apparatus in the automobile.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. A hydrostatic transmission, comprising:
   a prime mover which operates at a variable speed;
   a variable displacement pump including a displacement control element and powered by said prime mover;
   a fluid motor powered by said variable displacement pump;
   speed sensing means for sensing the speed of said prime mover and producing a speed signal;
   fluid actuated position control means for controlling the position of said displacement control element;
   selector means for determining neutral, forward or reverse modes of operation of said variable displacement pump by defining fluid paths to said fluid actuated position control means as a function of a selected mode;
   compensator means having high and low pressure input ports and output ports connected to said selector means for providing a high or low pressure signal on said output port as a function of said speed signal; and
   feedback means for transmitting a mechanical feedback signal representing the displacement of said variable displacement pump to said selector means and said compensator means to maintain said variable displacement pump at a displacement as a function of said selected mode and said sensed speed of said prime mover.

2. Apparatus in accordance with claim 1 wherein said selector means includes a rotatable servo control spool rotated to select modes of operation and a rotatable annular servo control sleeve connected to said feedback means to be rotated by said feedback signal, the relative angular position of said servo control spool and sleeve define said fluid paths as a function of selected modes and said feedback signal.

3. Apparatus in accordance with claim 2 wherein said compensator means includes a compensator spool responsive to said speed signal and a compensator sleeve which circles said compensator spool and responsive to said feedback signal; and wherein said feedback means includes a camming surface on the outer surface of said servo control sleeve and a cam follower contacting said camming surface, having a first end pivotable about a cam follower pivot and having a second end in contact with said compensator sleeve.

4. Apparatus in accordance with claim 3 wherein said hydrostatic transmission further comprises a fixed displacement pump powered by said prime mover, which fixed displacement pump produces a flow of fluid proportional to the speed of said prime mover, and said speed sensing means senses the speed of the prime mover by sensing the fluid flow from said fixed displacement pump.

5. Apparatus in accordance with claim 4 wherein said control means further includes pressure drop means, arranged at an outlet of said fixed displacement pump, for generating a pressure differential proportional to said fluid flow and to the speed of said prime mover, said speed sensing means sensing said fluid flow by sensing said pressure differential.

6. Apparatus in accordance with claim 5 wherein said speed sensing means further includes:
   a speed sense cylinder having a longitudinal bore, said speed sense piston being arranged within said bore and said speed sense piston having first and second opposed surfaces;
   a speed sense spring arranged within said speed sense cylinder biasing said speed sense piston to a predetermined, initial position; and
   means for providing fluid communication between said first and second opposed surfaces and points upstream and downstream, respectively, of said pressure drop means, whereby said speed sense piston may produce said mechanical speed signal in response to said pressure differential by moving against and compressing said speed sense spring within said speed sense cylinder in response to a pressure differential which exceeds a predetermined value.

7. Apparatus in accordance with claim 3 wherein said compensator sleeve has an inner diameter which is greater than a diameter of said compensator spool to thereby define a compensator annular space within which fluid may flow;
   said compensator sleeve including first and second spaced apart annular openings which are in fluid communication with, respectively, a first port and a second port;

said first port being in fluid communication with said high pressure input port;

said second port capable of being in fluid communication with either said first or said low pressure input port via said compensator annular space; and said compensator spool including a land which may be brought into or out of alignment with said second annular opening, the position of said land relative to said second annular opening determining whether said second port communicates with said low pressure input port or with said first port.

8. Apparatus in accordance with claim 7 wherein said selector means selects neutral, forward or reverse operation of said variable displacement pump by communicating a first end of said fluid actuated position control means to said second port and a second end of said fluid actuated position control means to said low pressure input port.

9. Apparatus in accordance with claim 8 wherein:

said rotatable servo control spool includes first and second angularly spaced radial bores, said first radial bore being in continuous fluid communication with said first end of said position control means and said second radial bore being in continuous fluid communication with said second end of said position control means;

said rotatable annular servo control sleeve has an inner diameter greater than a diameter of said servo control spool to define a servo control annular space between said control sleeve and said control spool, which servo control annular space is in continuous fluid communication with said second port about said compensator sleeve;

first and second radially opposed low pressure ports each of which extends radially through a wall of said servo control sleeve, which low pressure ports are in communication with a low pressure source, and which low pressure ports are provided, respectively, adjacent said first and said angularly spaced radial bores in said servo control spool; and said control spool being rotatable in a first direction to a first position wherein said first radial bore in said control spool is in fluid communication with said servo control annular space and said second radial bore in said control spool is in fluid communication with said second low pressure port, and said control spool being rotatable in a second direction to a second position wherein said first radial bore in said control spool is in fluid communication with said first low pressure port and said second radial bore in said control spool is in fluid communication with said servo control annular space.

10. A hydrostatic transmission, comprising:

a prime mover which operates at a variable speed;

a variable displacement pump including a displacement control element and powered by said prime mover;

a fluid motor powered by said variable displacement pump;

speed sensing means including a speed sense piston in a bore of a cylinder responsive to a fluid signal representing the speed of the prime mover for producing a mechanical speed signal;

feedback means for generating a mechanical feedback signal representing the displacement of said variable displacement pump;

fluid actuated position control means for controlling the position of said displacement control element;

servo means responsive to said mechanical speed signal and said mechanical feedback signal for providing a fluid signal to said position control means to maintain said variable displacement pump at a displacement proportional to the speed of the prime mover; and override means for overriding said speed sensing means including a rod arranged within said speed sense cylinder, a first end of said rod being arranged adjacent said speed sense piston and a second end of said rod projecting through an aperture in a wall of said speed sense cylinder.

11. Apparatus in accordance with claim 10 wherein said speed sensing means includes first and second springs biasing first and second opposed surfaces of said speed sense piston in opposite directions to define the speed of said prime mover at which the displacement of said variable displacement pump begins to increase from zero; and means for adjusting the tension of said first spring to regulate said speed of said prime mover at which the displacement of said variable displacement pump begins to increase from zero.

12. Apparatus in accordance with claim 11 wherein said servo means includes a compensator spool mechanically connected at a first end to said first surface of said speed sense piston, and said first spring engaging a second end of said compensator spool toward said first surface of said speed sense piston.

13. A method for regulating a hydrostatic transmission, comprising the steps of:

operating a prime mover at a variable speed;

powering a variable displacement pump with said prime mover;

powering a fluid motor with said variable displacement pump;

sensing the speed of said prime mover;

moving a compensator spool relative to a compensator sleeve as a function of sensed speed to communicate relatively high pressure fluid from a first port to a second port;

supplying said relatively high pressure fluid from said second port to a servo spool whose position is a function of operating modes and from said servo spool to a control cylinder which regulates the displacement of the variable displacement pump;

transmitting a mechanical feedback signal representing the displacement of said variable displacement pump from said variable displacement pump to a servo control sleeve encircling said servo control spool to rotate said servo control sleeve about said servo control spool and to said compensator sleeve to move said compensator sleeve relative to said compensator spool to hold said pump at a displacement as a function of the sensed speed of said prime mover and said operating mode.

14. The method of claim 13 further comprising the steps of:

powering a fixed displacement pump with said prime mover to produce a fluid flow from said fixed displacement pump proportional to the speed of said prime mover;

generating a pressure differential proportional to the speed of said prime mover at an outlet of said fixed displacement pump;

sensing said pressure differential; and producing a mechanical speed signal in response to said pressure differential when said pressure differential exceeds a predetermined value.

15. The method of claim 14 wherein the step of sensing said pressure differential includes the step of communicating said pressure differential to a speed sense piston arranged within a speed sense cylinder, which piston is biased to a predetermined initial position by a spring within said cylinder.

16. The method of claim 13 wherein the step of regulating the displacement of said variable displacement pump further includes the steps of:
    moving a control piston within said control cylinder;
    moving a control piston rod, connected to said control piston, within said control cylinder; and
    pivoting a swash plate of the variable displacement pump about a pivot, which swash plate is connected to said control piston rod, to vary the displacement of said variable displacement pump in accordance with the speed of the prime mover.

17. The method of claim 16 wherein the step of transmitting a mechanical feedback signal includes the steps of:
    rotating said servo control sleeve about said servo control spool in response to a motion of said swash plate;
    simultaneously rotating a camming surface on said control sleeve into contact with a cam follower;
    pivoting said cam follower about a pivot and into contact with said compensator sleeve; and
    moving the compensator sleeve relative to said compensator spool to stop the communication of relatively high pressure fluid from said first port to said second port, to thereby hold the variable displacement pump at a displacement proportional to the speed of the prime mover.

* * * * *